INVENTOR.
ROBERT W. COGGINS

INVENTOR.
ROBERT W. COGGINS
BY
*Arthur L Wade*
ATTORNEY

Oct. 15, 1968 R. W. COGGINS 3,405,509
MEANS FOR CONSERVING HEAT AND REGULATING TEMPERATURE IN A STACK
Filed Nov. 8, 1966 3 Sheets-Sheet 3

INVENTOR.
ROBERT W. COGGINS
BY Arthur L. Wade
ATTORNEY

United States Patent Office 3,405,509
Patented Oct. 15, 1968

3,405,509
MEANS FOR CONSERVING HEAT AND REGULATING TEMPERATURE IN A STACK
Robert W. Coggins, Tulsa, Okla., assignor to Combustion Engineering, Inc., New York, N.Y., a corporation of Delaware
Filed Nov. 8, 1966, Ser. No. 592,826
6 Claims. (Cl. 55—160)

ABSTRACT OF THE DISCLOSURE

Heat normally exhausted from a firetube is recovered by employing a heat exchanger in the vent stack of the firetube to recover the heat. Selected liquid from a vessel is passed through the heat exchanger to recover the heat. Temperature control is employed to control the amount of liquid withdrawn from the vessel and passed through the heat exchanger.

---

The present invention relates to the return of heat normally exhausted from fired units which field-process oil well production and maintaining the temperature of products of the combustion discharged within safe limits.

Gas for firing field-processing equipment in the oil field is becoming more expensive and in shorter supply. All heat that can be salvaged must be cycled back into the process to maintain the firing loading at a minimum. This need is generally recognized, however, the specific problem of salvaging heat from the exhaust stack of a fired oil field vessel processing producing has not been fully met. Additionally, the salvage problem has not been met in coordination with meeting the safety problems of excessively high temperatures of the firing unit coming into contact with hazardous fluids external the equipment.

A principal object of the invention is to salvage heat from the exhaust stack of a fired oil field unit for the process being carried out in the unit.

Another object is to select fluid with which to salvage heat which fluid will not contain material which will impair the function of the heat exchange process at the stack.

Another object is to regulate the fluid selected to salvage stack heat to maintain the temperature of the products of combustion, eventually exhausted to the atmosphere, within a predetermined range.

Figure 1:
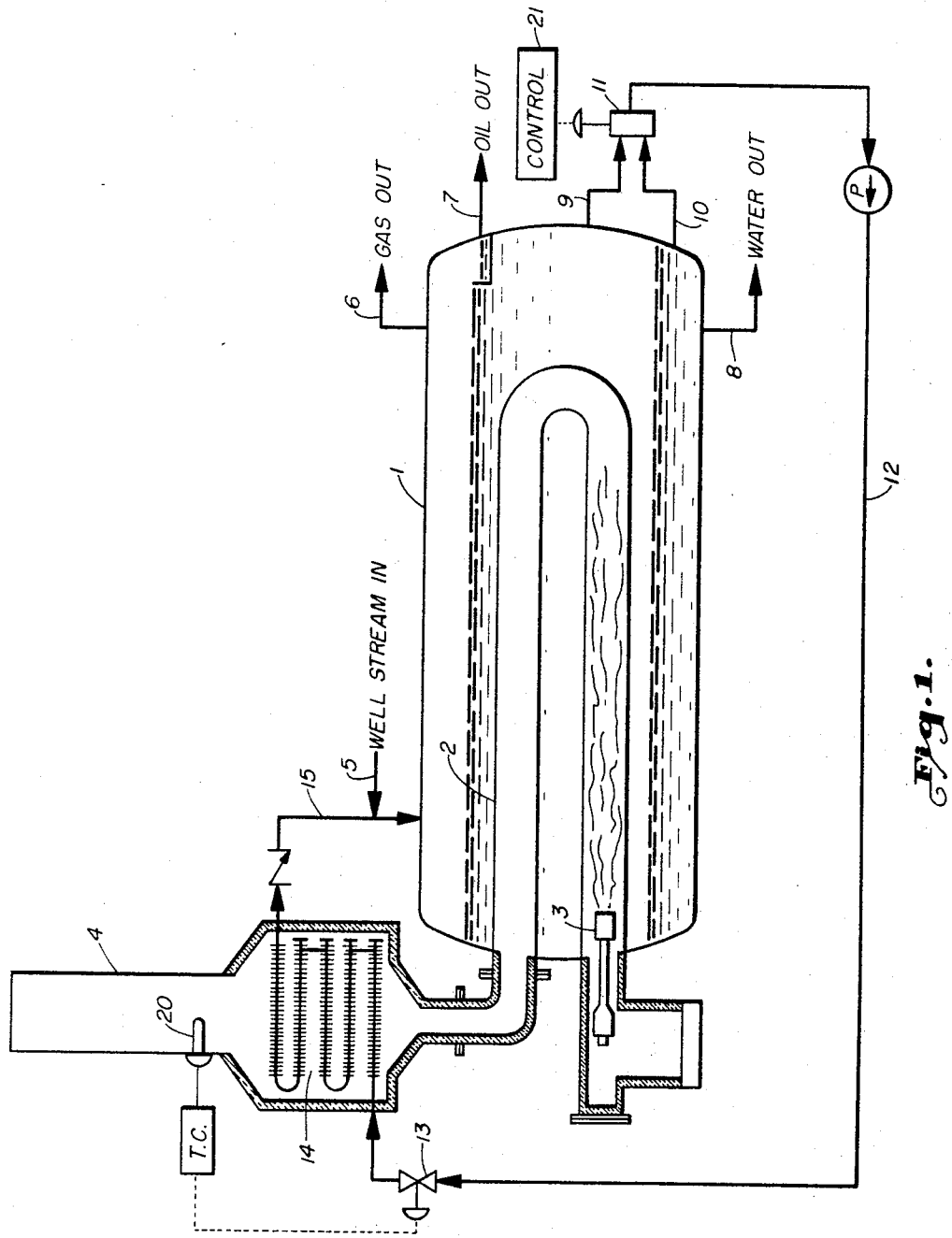

Other objects, advantages and features of this invention will become apparent to one skilled in the art upon consideration of the written specification, appended claims, and attached drawings, wherein:

FIG. 1 is a somewhat diagrammatic illustration of a field processing fired unit in which the invention is embodied; and FIGS. 2–5 are diagrammatic illustrations of a liquid desiccant reconcentrating system in which heat scavenging fluid is selected from various sources and re-introduced into the system at various locations.

A general problem as found in FIG. 1

FIG. 1 is a somewhat diagrammatic representation of a complete system for operating a fired unit which is field-processing oil well production fluids. More specifically, the fired unit is receiving production of which water makes up a large percentage of the liquids. Additionally, the production is received at low temperatures, in the order of 40° F. There is little, if any, gas available from this production. The gas for firing must be largely purchased as significant expense to facilitate water removal and provide some emulsion breaking in preparation for a more sophisticated processing downstream of this field unit.

More specific features of the problem

The vessel represented in FIG. 1 was actually sold for use in Alaska. Even by oil field standards the actual reduction to practice is a "monster" in size. The physical dimensions of the shell of the vessel are 12 ft. in diameter by 30 ft. in length. This size is selected to have a throughput in the order of 25,000 bbl./day of liquid production, up to 56% of which is water.

The gas in this production is low, in the order of 13 cu. ft./bbl. The heating required to field-process the liquids as in the order of 19 MM B.t.u./hr. Obviously not much help is available from the gas of the production. From a base of about 85% efficiency in the heating equipment, it can be appreciated that about 22 MM B.t.u./hr. is required. The 13 cu. ft./bbl. of gas available falls far short of being able to supply the heat required. Conservation of heat becomes a vital economic factor in the operation of this piece of equipment. Salvage from the exhaust stack becomes of great importance; direction of the heat into the oil and emulsion of the liquids is very desirable in utilization of the heat to best advantage.

It is generally recognized that some form of heat exchange structure mounted in the exhaust stack is necessary to salvage heat from the products of combustion. The fluid in the exchanger, to absorb the heat in salvage, must be carefully selected.

The heat exchange fluid must not contain material in its make-up, or have material suspended in it, which will precipitate from the fluid, inside the exchanger. The passages inside the exchanger must not be narrowed by deposits or be attacked and weakened structurally. Still, the fluid should have a high coefficient of heat transfer to function efficiently. The selection should give due consideration to all these factors.

If the fluid for the exchanger is properly selected, its rate of feed to the exchanger must be additionally controlled. Salvage of the heat with the fluid is an object, however, the temperature of the products of combustion leaving the exchanger, up the stack, must not be brought too low under some conditions. The fuel burned may produce all sorts of materials detrimental to the external structure of the heat exchanger and to the stack in which the exchanger is mounted. Sulphur dioxide represents such corrosive material. If the temperature of the products of combustion is lowered until this material condenses on the surfaces of the exchanger, rapid deterioration can be expected.

Temperatures which are too low in the exhaust gases create one hazard. However, temperatures which are too high develop another hazard, in addition to the loss of heat which could be scavenged. There is the ever present possibility that hydrocarbon gas will collect externally about equipment processing oil well production. If this gas collects and comes into contact with a substance at its ignition temperature a serious fire and/or explosion results. Obviously this must be avoided, so the upper level of temperature for the products of combustion discharged to atmosphere must be restricted to a safe level and the fluid flow through the heat exchanger to maintain the desired level for safety.

Salvage, selection and safety become symbolic of the objectives of the present invention. The maximum heat must be salvaged, or conserved, for the process. The fluids for heat exchange must be selected in view of the salvage function and the physical requirements of the equipment. Finally, the temperature of the exhaust must be regulated to obtain the desired degree of salvage with the fluid selected and with the additional view that safe exhaust temperatures must be maintained.

Basic structural arrangements in FIG. 1

FIG. 1 illustrates the essential structural elements which embody the concepts of the invention. The fluid processing unit has a shell 1 in which a firetube is mounted. A burner 3 represents conventional fuel-burning equipment which produces products of combustion which flow into tube 2 from its entrance end and out exhaust stack 4.

Tube 2 exchanges the heat of its products of combustion with oil well production fluids flowed through shell 1. The stream of these fluids comes to the unit through inlet 5. The various components of the stream are separated within shell 1 by the use of the heat and are drawn off through outlets 6, 7, and 8.

It is to be clearly understood that no attempt is being made to specifically characterize the nature of the process carried out in vessel 1 beyond the suggestion of the fundamental desire to separate the components of the stream carried with the use of heat. This is a well known process carried out with crude oil streams and is generically termed "treating." Sometimes it is more accurately called "dehydration" in that water is thereby separated from the stream, leaving predominantly oil and emulsion. Therefore, the separate strata of oil and/or emulsion and water represent at least two choices of fluids which are available for the heat exchange of salvage.

The oil and water are flowed separately from their respective stratums through conduits 9 and 10. These conduits are connected to valve 11 and a predetermined rate of flow from each conduit is passed by valve 11 to conduit 12. The rate of total flow in conduit 12 is determined by the setting of valve 13 through which the fluid flows into salvage heat exchanger 14. Conduit 15 receives the discharge from exchanger 14 and joins conduit inlet 5 so the heated salvage fluid will join with the well stream flowing into shell 1.

Controls in FIG. 1

The basic controls for the well stream flow into shell 1; the gas, oil and water out; and even the fuel and oil to burner 3 are deemed, in this disclosure, conventional enough to be common knowledge. It is the proportioning of the fluids which make up the stream of salvage fluid, and the rate of flow of that stream through the heat exchanger, which take stage front in this disclosure of the controls associated with the invention.

Fundamentally, the temperature of the products of combustion leaving the exchanger and flowing up stack 4 must be sensed and controlled. A temperature sensing, primary, element 20 is indicated as mounted to extend within stack 4. Element 20 is then connected to a suitable, conventional mechanism which will develop an output signal for controlling the position of valve 13. In this manner, the rate of fluid flow through exchanger 14 is regulated as desired in response to the stack temperature.

A control mechanism is indicated at 21 for positioning proportioning valve 11. The mix, or blend, of a plurality of fluids for conduit 12 depends upon several characteristics of each fluid and the characteristics of their resulting mixture. For example, oil has a lower coefficient of heat transfer than water, favoring the use of water as a salvage fluid in exchanger 14. However, the water may have calcium carbonate, or some other material, which will deposit on the internal surface of the exchanger 14 with a rise in temperature.

Also, heating water and then transferring this heat to the total well stream is inherently a waste of heat. However, the oil may break down with the elevation in temperature required for heat salvage in this system. Coking of some portion of the oil may take place and result in harmful deposits on the exchanger interior. Therefore, several factors may require detection and use in selecting the action taken through control 21 in positioning valve 11 to establish the optimum mixture of fluids for conduit 12 which is pumped through exchanger 14 under the regulation of valve 13.

Employment of a single proportioning valve 11, and a control mechanism 21, implies automatic regulation of the make-up of the total stream in conduit 12. Automatic regulation is feasible, with primary elements available to respond to the characteristics of the fluids and establish a control signal through station 21 for regulation of valve 11. However, individual valves in conduits 9 and 10 may be utilized. These individual, hand-controlled valves may be set to select the desired proportion of fluids for the salvage stream. Testing for the characteristics of each stream will, in many cases, guide the setting of the manual valves. The characteristics of the fluids, under many production conditions, do not change rapidly and it is quite possible that manual controls will be practical under those conditions.

Operation of FIG. 1

The well stream is expected to be produced into shell 1 on a more or less continuous basis. The free water should drop out readily in the large capacity provided by the volume of the shell. The addition of heat will further this separation of this water. The heat could even be sufficient to carry out breaking of the bond between the water and oil which make up the emulsion in the stream.

Some heat is absorbed by the water in the shell 1. Ideally it is desired to use none of the heat in the water, but this is not practical. Still, if the level of the water is maintained below the firetube 2, most of the heat from the tube will be used in the work of raising the temperature of the oil and emulsion.

A selection of the fluids in shell 1 is made for heat exchange with gases in the exhaust stack of firetube 1. The total rate of fluid flow to the exchange-salvage process is controlled by the temperature at 20. After absorbing this heat, the fluids should be introduced so they will put the heat to work as directly as possible.

FIG. 1 shows the heated exchange fluid being mixed with the entering well stream in conduit 5. However, it might be better to flow this heated fluid directly into the oil and emulsion stratum heated by firetube 2. In either arrangement, heat is cycled back into the process to conserve and keep it at work in shell 1.

Also, the control of the stream in conduit 12 is on direct flow through exchanger 14. However, it may be desirable to by-pass some of this stream around exchanger 14 at some load conditions. This by-pass can be controlled readily with a valve which could replace valve 13. Specific conditions of heat levels, exchanger surface, salvage stream rate, etc., will require refinements to the basic control system illustrated.

FIGS. 2–5 in general

FIGS. 2–5, taken individually, each depicts a portion of a liquid desiccant dehydration system, more specifically, that portion wherein the desiccant is reconcentrated after it has absorbed water from a fluid. More broadly, these systems represent another type of fired unit of oil field processing. The fluids involved have characteristics different from those of FIG. 1, but the needs for heat salvage, exchange fluids selection and safety requirements for the temperatures generated are in common with the FIG. 1 disclosure.

In all FIGS. 1–5, a vessel 30 is utilized to retain fluids requiring heat. Firetube 31 supplies heat from a burner at 32 and the exhausted products of combustion up stack 33 are heat exchanged with a fluid selected for heat exchanger 34. The temperature of the products of combustion, downstream of heat exchanger 34, is sensed by element 35. This element 35 generates a control signal for a valve 36 which regulates the amount of fluid allowed to flow through heat exchanger 34.

The entire unit of FIGS. 1–5 may be described, in one sense, as a boiler in that the heat from the firetube 31 essentially boils water from the fluid flowed into it. This work is somewhat different from the work of heat in the FIG. 1 unit and perhaps easier to understand.

This reconcentrating process is well-known in the natural gas industry which has long employed glycol as the desiccant for drying gas.

The heat-reconcentrated desiccant is collected in the far end of shell 30 and conducted to a surge vessel 37. Aside from storage, the vessel 37 offers an opportunity to heat exchange the wet, or rich, glycol fed into vessel 30, down a packed column. This heat exchange is a well-known function and forms no part of the present disclosure. What the surge vessel 37 does here is provide another illustration of the concept of selection of heat exchange fluid for exchange structure 34.

In the case of FIGS. 2–5, a conduit 38 is disclosed as conducting fluid to the packed column of vessel 30 "from process." The "process" associated with this particular system is the contact of the fluid desiccant with gas to absorb its water. Correspondingly, in each figure a conduit 39 returns the reconcentrated fluid desiccant "to process."

Beyond the common denominator features of the FIGS. 2–5 systems, there are the individual arrangements for heat exchange fluid to be conducted through exchanger 34. This selection of exchange fluid for heat salvage, and the control of exhausted products of combustion to within a safe range of temperatures, complements the FIG. 1 disclosure and emphasizes the breadth of the invention.

FIG. 2

Figure 2:
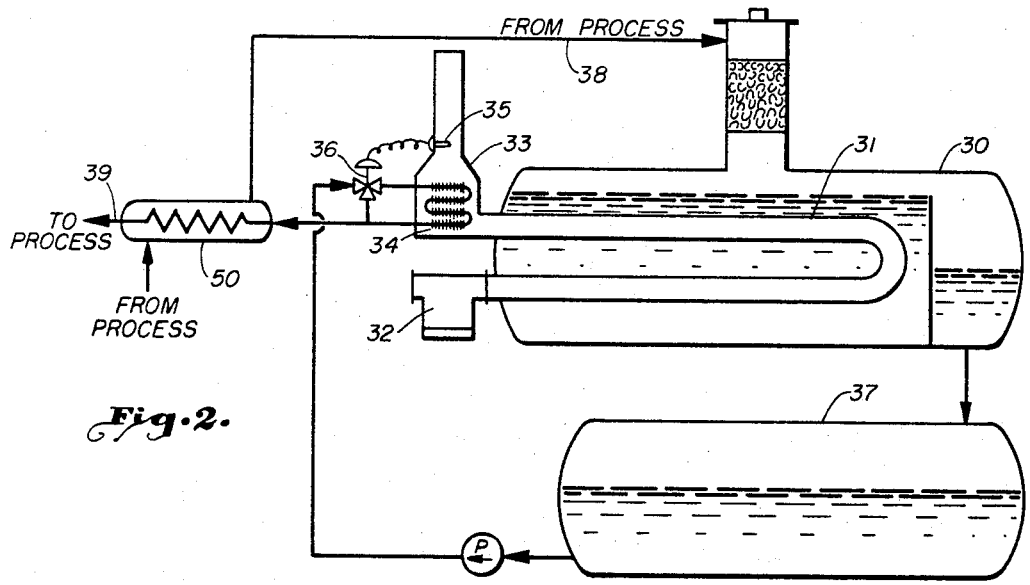

FIG. 2 discloses selection of the reconcentrated desiccant from surge tank 37 for heat salvage in exchanger 34 followed by cycle of the heat into the feed stream of conduit 38 in heat exchanger 50. The control of valve 36 sets the upper level of the temperature of exhaust gases from stack 33 for safety provisions. The heat absorbed by the exchanger 34 is salvaged into the fluid feed for fired vessel 30. All features of the invention are found in this disclosure.

FIG. 3

Figure 3:
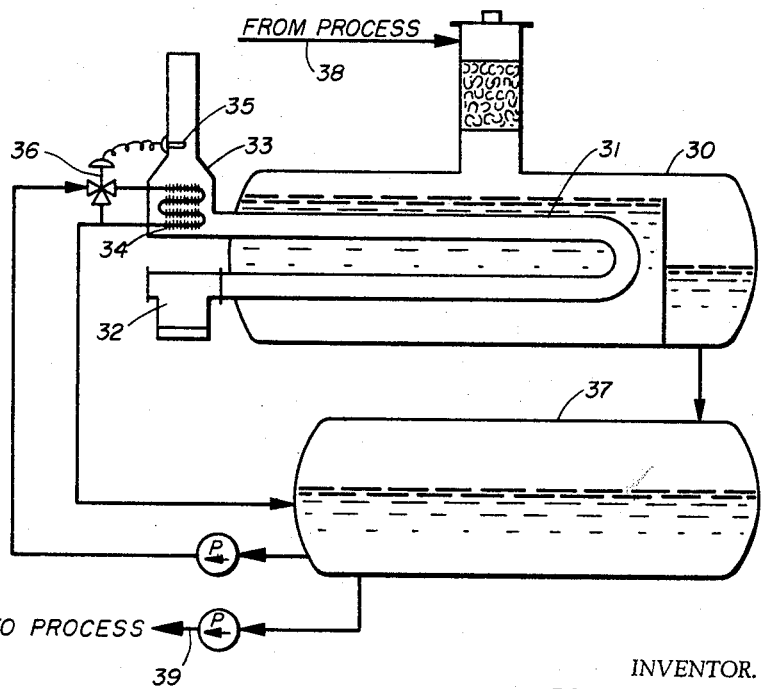

FIG. 3 discloses the exchanger 34 in a closed circuit with the desiccant of surge tank 37. The cooler fluid from the bottom of tank 37 is pumped through exchanger 34 and returned to the warmer portion of tank 37. Heat exchange of the feed of conduit 38 can recover the heat to the process. All features of the invention are disclosed in this arrangement.

FIG. 4

Figure 4:
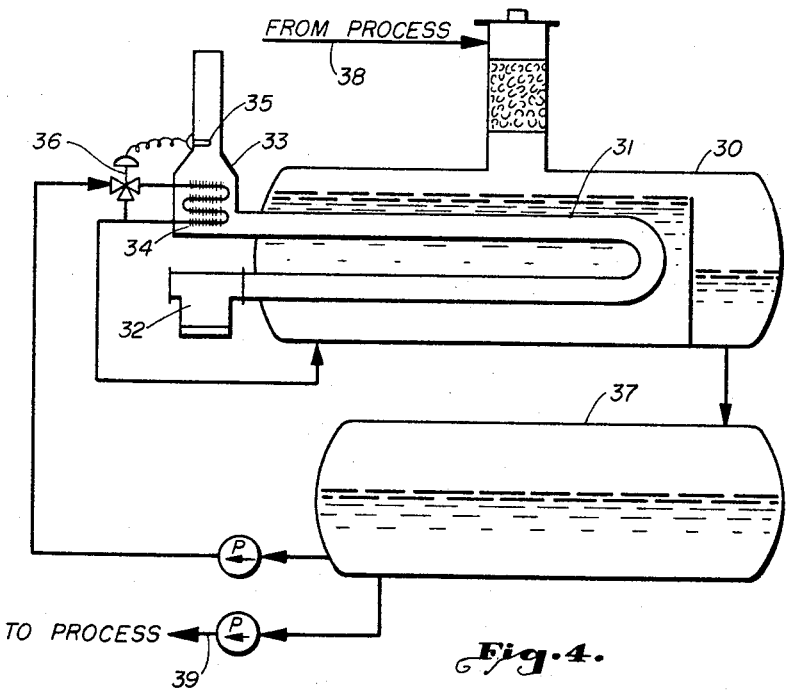

FIG. 4 discloses the exchanger 34 fed from the lower portion of vessel 37 but returning the heated fluid to the reboiler vessel 30. All features of the invention are disclosed in this arrangement.

FIG. 5

Figure 5:
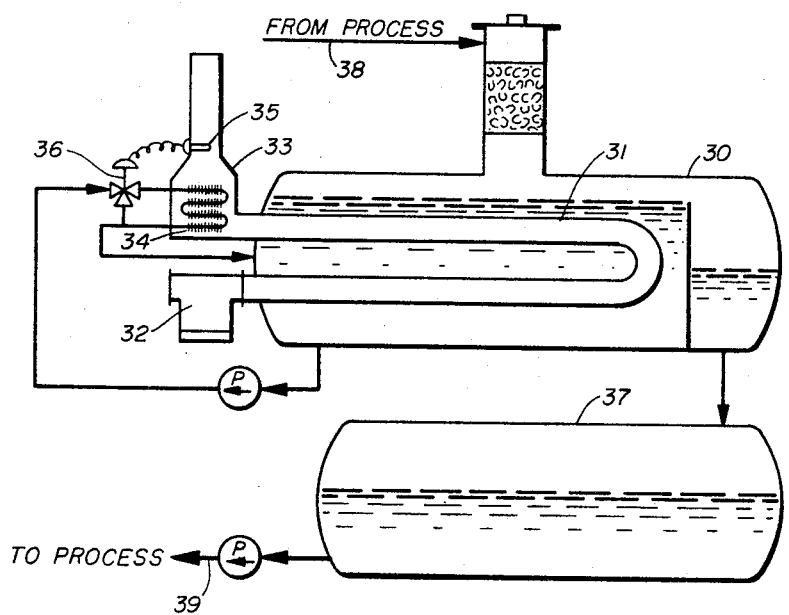

FIG. 5 discloses the exchanger 34 in a closed circuit with the reconcentrating desiccant of vessel 30. The cooler desiccant is drawn from the lower portion of vessel 30 and returned to near the firetube 31. All features of the invention are disclosed in this arrangement.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for the salvage of heat from products of combustion in oil field equipment, including,
   a vessel of the equipment having a fluid inlet through which is received a fluid associated with the field-processing of oil well production,
   a firetube mounted in the vessel in heat exchange with the associated fluids,
   a stack extending from the vessel through which products of combustion from the firetube are discharged,
   a heat exchanger mounted in the stack,
   a conduit system connected to the exchanger and a predetermined collection of the fluid flowed through the vessel to pass the fluid through the exchanger and return heat absorbed to the vessel of the equipment,
   and a temperature element connected to the stack downstream of the exchanger and to the conduit system to control the temperature of the products of combustion discharged from the stack by regulation of the fluid flow through the exchanger.

2. The system of claim 1 in which the vessel is the reboiler of a liquid desiccant reconcentrating system,
   and the fluid is liquid desiccant.

3. A system for the salvage of heat from products of combustion in oil field equipment with which production is field-processed, including,
   a vessel of the equipment receiving fluids associated with the field-processing of oil well production,
   a firetube mounted in the vessel in heat exchange relation with the associated fluids, which heating prepares fluids for the field-processing of the production,
   a burner mounted in one end of the firetube and discharging products of combustion down the tube to provide the heat for preparation of the associated fluids,
   a stack mounted on the other end of the firetube and discharging the products of combustion to the atmosphere a heat exchanger mounted in the stack to contact the products of combustion in a heat exchange relationship with a selected fluid of the field-process.
   a first conduit connected to the vessel to draw off a first selected phase of the production fluids to pass through the heat exchanger,
   a second conduit connected to the vessel to draw off a second selected phase of the production fluids to pass through the heat exchanger,
   means for selecting a predetermined proportion of the selected phases to pass through the heat exchanger,
   and a temperature control responsive to the products of combustion discharged to the atmosphere and controlling the proportioned selected phases to the heat exchanger to maintain the temperature of the products of combustion within a predetermined range.

4. A system for the salvage of heat from products of combustion in oil field equipment with which production is field processed, including,
   a vessel receiving production fluids from an oil well and in which the fluids are caused to separate,
   a firetube mounted in the vessel in heat exchange relation with the production liquids, which heating furthers the separation of the phases of the stream,
   a burner mounted in one end of the firetube and discharging products of combustion down the tube to provide the heat, a stack mounted on the other end of the firetube and discharging the products of combustion to the atmosphere,
   a heat exchanger mounted in the stack to contact the products of combustion in a heat exchange relationship with a selected liquid of the production liquids,
   a first conduit connected to the vessel to draw off a first selected phase of the separated production liquids to pass through the heat exchanger,
   a second conduit connected to the vessel to draw off a second selected phase of the separated production liquids to pass through the heat exchanger, means for selecting a predetermined proportion of the selected liquid phases to pass through the heat exchanger, and a temperature control responsive to the products combustion discharged to the atmosphere and controlling the proportioned selected liquid phases to the heat exchanger to maintain the temperature of the products of combustion within a predetermined range.

5. The system of claim 4 in which, the vessel is connected and arranged to receive production fluids and separate the liquids into water and a mixture of oil and emulsion, the first conduit draws off water, and the second conduit draws off oil and emulsion.

6. The system of claim 5, in which, the liquid phases to the heat exchanger are controlled to maintain the temperature within a range below the ignition temperature of a hazardous mixture collection external the oil field equipment.

References Cited

UNITED STATES PATENTS

| | | | |
|---|---|---|---|
| 2,202,507 | 5/1940 | Swietochowski | 122—31 |
| 2,982,532 | 5/1961 | Hakes | 55—268 |
| 3,321,002 | 5/1967 | Winkler | 159—29 |

REUBEN FRIEDMAN, *Primary Examiner.*

CHARLES N. HART, *Assistant Examiner.*